(12) United States Patent
Emizu et al.

(10) Patent No.: US 7,070,528 B2
(45) Date of Patent: Jul. 4, 2006

(54) HYDRAULIC TENSIONER LIFTER

(75) Inventors: Osamu Emizu, Saitama (JP); Ryuta Niimura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 120 days.

(21) Appl. No.: 10/395,258

(22) Filed: Mar. 25, 2003

(65) Prior Publication Data

US 2003/0216202 A1 Nov. 20, 2003

(30) Foreign Application Priority Data

Mar. 28, 2002 (JP) ............................. 2002-091369
Mar. 28, 2002 (JP) ............................. 2002-091764

(51) Int. Cl.
*F16H 7/08* (2006.01)
*F16H 7/22* (2006.01)

(52) U.S. Cl. ...................................... 474/110; 474/109

(58) Field of Classification Search ........ 474/109–111, 474/91, 101
See application file for complete search history.

(56) References Cited

U.S. PATENT DOCUMENTS

| | | | |
|---|---|---|---|
| 4,507,103 A | | 3/1985 | Mittermeier |
| 4,826,470 A | * | 5/1989 | Breon et al. ................ 474/110 |
| 4,997,410 A | * | 3/1991 | Polster et al. ............... 474/110 |
| 4,997,411 A | | 3/1991 | Breon et al. |
| 5,030,169 A | | 7/1991 | Kiso et al. |
| 5,087,225 A | * | 2/1992 | Futami et al. ................ 474/91 |
| 5,314,388 A | | 5/1994 | Sakamoto et al. |
| 5,707,309 A | * | 1/1998 | Simpson ..................... 474/110 |
| 5,935,031 A | * | 8/1999 | Tada .......................... 474/110 |
| 6,193,623 B1 | * | 2/2001 | Koch et al. ................. 474/110 |
| 6,196,939 B1 | * | 3/2001 | Simpson ..................... 474/109 |
| 6,383,103 B1 | * | 5/2002 | Fujimoto et al. ........... 474/110 |
| 6,435,993 B1 | * | 8/2002 | Tada .......................... 474/109 |
| 2001/0006917 A1 | | 7/2001 | Hashimoto |

FOREIGN PATENT DOCUMENTS

| | | | |
|---|---|---|---|
| EP | 0 989 329 A | 3/2000 | |
| EP | 1 067 314 A | 1/2001 | |
| JP | 03-260445 A | * 11/1991 | .................. 474/91 |
| JP | 07-42806 A | * 2/1995 | |
| JP | 08-326854 A | * 12/1996 | |
| JP | 2000-240744 A | 9/2000 | |
| JP | 2001 012569 A | 1/2001 | |

* cited by examiner

*Primary Examiner*—Marcus Charles
(74) *Attorney, Agent, or Firm*—Birch, Stewart, Kolasch & Birch, LLP

(57) ABSTRACT

To provide a hydraulic tensioner lifter which can reduce the filling time of oil pressure into an oil chamber which is in a state wherein air is present therein and can sufficiently exhibit a vibration-damping function. A hydraulic tensioner lifter for applying tension to an endless power transmission band of a power transmission mechanism includes a plunger fitted for sliding movement in an accommodation hole of a tensioner body B and cooperating with the tensioner body B to define an oil chamber therebetween. An air-bleeder mechanism is provided for exhausting air in the oil chamber to the outside of the oil chamber. The purge valve P has a check valve function of permitting the exhaustion of the air in the oil chamber to the outside of the oil chamber but blocking admission of air into the oil chamber from the outside of the oil chamber and blocking discharging of the oil pressure in the oil chamber to the outside of the oil chamber. In addition, the volume of oil in the oil chamber may be decreased by a spring guide portion which is accommodated in the inside of the tensioner spring for guiding the tensioner spring.

22 Claims, 8 Drawing Sheets

HYDRAULIC TENSIONER LIFTER

CROSS-REFERENCE TO RELATED APPLICATIONS

The present nonprovisional application claims priority under 35 USC 119 to Japanese Patent Application No. 2002-091369 and No. 2002-091764 both filed on Mar. 28, 2002 the entire contents thereof is hereby incorporated by reference.

BACKGROUND OF THE INVENTION

1. Field of the Invention

The present invention relates to a hydraulic tensioner lifter of a tensioner for applying tension to an endless power transmission band such as a chain or a belt used for a power transmission mechanism, for example, in an internal combustion engine.

2. Description of Background Art

Conventionally, in an internal combustion engine, a hydraulic tensioner lifter is used in order to apply suitable tension to an endless power transmission band used for a power transmission mechanism such as, for example, a chain. In this hydraulic tensioner lifter, an oil chamber is formed between a plunger biased by a tensioner spring for applying tension to a chain and a tensioner body, and oil pressure is supplied into the oil chamber through a check valve. If a slack occurs with the chain during operation, then the plunger is advanced outwardly from the tensioner body by the resilient force of the tensioner spring, and oil pressure flows into the oil chamber to apply tension to the chain. On the other hand, if the chain is tightened and a load in a direction in which the plunger is to be retracted acts upon the plunger from the chain, then the oil pressure in the oil chamber stops the retreating movement of the plunger to suppress vibration of the chain.

Incidentally, when the internal combustion engine stops, a supply of oil pressure into the oil chamber of the tensioner lifter stops, and therefore, as time passes, the oil pressure in the oil chamber gradually leaks through a very small gap between sliding portions of the plunger and the tensioner body and so forth, whereupon air is admitted into the oil chamber. Accordingly, upon starting of the internal combustion engine, when oil pressure is to be supplied into the oil chamber which is not filled with oil pressure, preferably air in the oil chamber is exhausted rapidly in order to allow the vibration-damping function of the tensioner lifter to be exhibited at an early stage.

Thus, for example, in a hydraulic tensioner (which corresponds to a tensioner lifter) disclosed in the official gazette of Japanese Patent Laid-Open No. 2000-240744, a housing (which corresponds to a tensioner body) which cooperates with a plunger to define a high oil pressure chamber therebetween includes an orifice member provided therein in which an orifice communicated with an upper portion of the high oil pressure chamber is formed. If the plunger which is biased by a plunger spring (which corresponds to a tensioner spring) to project to the outside of the housing is acted upon by an impact, a load or the like in a direction in which the plunger is to be retracted from a chain and the oil pressure in the high oil pressure chamber rises, then air or oil in the high oil pressure chamber leaks through the orifice thereby to moderate the impact upon the plunger from the chain or the like.

Incidentally, in the prior art described above, since the orifice is in communication with the upper portion of the high oil pressure chamber, it is considered that air admitted into the high oil pressure chamber is exhausted from the high oil pressure chamber by oil pressure supplied into the high oil pressure chamber upon the starting of the internal combustion engine. According to this, the high oil pressure chamber is quickly filled with oil pressure. However, since the high oil pressure chamber is normally communication with the outside of the high oil pressure chamber through the orifice, also after the air is exhausted, the oil flows out from the high oil pressure chamber through the orifice. Therefore, the filling time becomes long. In addition, if the chain becomes slackened and the plunger quickly advances outwardly, then the high oil pressure chamber is sometimes momentarily brought into a negative pressure state from the relationship to the viscosity of the oil pressure and the oil feeding rate into the high oil pressure chamber. In such an instance, there is the possibility that the external air may be admitted into the high oil pressure chamber through the orifice.

Japanese Patent Laid-Open No. 2000-240744 also includes an accommodation hole formed therein with a plunger fitted for sliding movement in the accommodation hole and cooperating with the housing to define a high oil pressure chamber therebetween. A plunger spring is disposed in the inside of the plunger for biasing the plunger so that one end portion of the plunger may project outwardly from the housing. Further, a check valve mechanism for supplying oil into the oil chamber from a feed oil path provided in the housing is provided at a bottom portion of the accommodation hole, and a relief valve is provided on the outward projection side of the plunger. The relieve valve is composed of a sleeve provided for sliding movement in an orifice member force fitted in the plunger, and an outflow exit formed in the orifice member. Further, the plunger spring is disposed between the bottom portion of the accommodation hole and the plunger in the proximity of an end face of the orifice member adjacent the oil chamber. Furthermore, rather near to the end of the plunger, an oil reservoir chamber into which oil flowing out from the outflow exit of the relief valve flows is formed between the orifice member and the plunger, and a plug having a discharge port for discharging oil in the oil reservoir chamber to the outside of the tensioner is provided at the end of the plunger.

Further, in the tensioner described above, if a slack occurs with the chain which is operating, then the plunger projects from the housing by the resilient force of the plunger spring and oil pressure flows into the oil chamber through the check valve mechanism to apply tension to the chain. On the other hand, if the chain becomes tight and a load in the direction in which the plunger is retracted acts upon the plunger, then the oil pressure in the high oil pressure chamber resists the retreating movement of the plunger so that suitable tension may be applied to the chain while suppressing the vibration of the chain. Further, if the plunger is acted upon by a load in the retreating direction from the chain and the oil pressure in the high oil pressure chamber rises excessively, then the relief valve operates and the sleeve moves against the sleeve spring to open the outflow exit so that the oil in the high oil pressure chamber flows out from the outflow exit thereby to prevent an excessively high oil pressure from being generated in the high oil pressure chamber. Then, the oil flowing out from the outflow exit flows into the oil reservoir chamber and then is discharged from the oil reservoir chamber to the outside of the housing through the discharge port.

Incidentally, when the internal combustion engine stops, no oil is supplied into the oil chamber of the tensioner lifter, and therefore, as the time passes, the oil in the high oil pressure chamber gradually leaks through sliding portions of the plunger and the tensioner body and so forth, whereupon the amount of the oil in the high oil pressure chamber decreases and air is admitted into the high oil pressure chamber. Therefore, upon starting of the internal combustion engine, the vibration-damping function of the tensioner acts after the oil chamber is filled with oil. However, in the prior art described above, since the plunger spring is disposed between the bottom portion of the accommodation hole and the plunger in the proximity of the end face of the orifice member adjacent the oil chamber, as the volume of the high oil pressure chamber increases, the filling time until the high oil pressure chamber is filled with oil after oil in the oil chamber leaks becomes long.

Further, in the prior art described above, in order to discharge oil in the high oil pressure chamber to the outside of the tensioner through the relief valve, the oil reservoir chamber formed from the plunger and the plug provided at the end of the plunger are required. Therefore, a great number of steps for assembly of the mechanism for discharging oil to the outside of the tensioner are required. Further, in order to discharge oil from the outflow exit of the relief valve to the outside of the tensioner, it is necessary to form the oil reservoir chamber and the discharge port. Therefore, a large size is required for the plunger and hence for the tensioner.

SUMMARY AND OBJECTS OF THE INVENTION

The present invention has been made in view of such circumstances as described above, and it is an object of the present invention to provide a hydraulic tensioner lifter which can reduce the filling time of oil pressure into an oil chamber which is in a state wherein air is present therein and can sufficiently exhibit a vibration-damping function.

It is an object of the present invention to make compact the tensioner lifter which further includes a purge valve.

It is also an object of the present invention to reduce the cost of the tensioner lifter which further includes a purge valve and increase the degree of freedom of the layout of the tensioner lifter.

It is a further object of the present invention to reduce the consumption of lubricating oil of an internal combustion engine arising from exhaustion to the outside air which is exhausted from the oil chamber and contains oil components to contribute to the prevention of environmental pollution.

It is another object of the present invention to increase the degree of freedom of the layout of the tensioner lifter where the air exhausted is introduced into an internal space of the internal combustion engine.

According to the present invention, a hydraulic tensioner lifter includes a tensioner body having an accommodation hole formed therein. A plunger is fitted for sliding movement in the accommodation hole and cooperates with the tensioner body to define an oil chamber therebetween. A tensioner spring is provided for biasing the plunger in an advancing direction. A control valve is provided for allowing an inflow of oil pressure into the oil chamber but blocking outflow of the oil pressure from the oil chamber. An air-bleeder mechanism is provided for exhausting air in the oil chamber to the outside of the oil chamber. Tension is applied to an endless power transmission band of a power transmission mechanism by the plunger advanced from the accommodation hole with such a configuration such that the air-bleeder mechanism includes a purge valve having an entrance positioned at an uppermost portion of the oil chamber and having a valving element for opening and closing an exhaust path for introducing air in the oil chamber to the outside of the oil chamber. The purge valve has a check valve function of permitting the exhaustion of the air in the oil chamber to the outside of the oil chamber but blocking admission of air into the oil chamber from the outside of the oil chamber and blocking discharging of the oil pressure in the oil chamber to the outside of the oil chamber.

Consequently, when oil pressure is supplied into the oil chamber in which air is present, the air is exhausted to the outside of the oil chamber through the purge valve which is opened while the oil pressure supplied into the oil chamber is blocked from being discharged to the outside of the oil chamber by the purge valve. Further, if the plunger rapidly advances outwardly and the hydraulic pressure in the oil chamber is momentarily placed into a negative pressure, then admission of air into the oil chamber from the outside of the oil chamber is blocked by the purge valve.

As a result, according to the present invention, the following effects are exhibited. In particular, since the air-bleeder mechanism includes the purge valve having the valving element for opening and closing the exhaust path for introducing air in the oil chamber to the outside of the oil chamber and the purge valve has the check valve function of permitting exhaustion of the air in the oil chamber to the outside of the oil chamber but blocking admission of air into the oil chamber from the outside of the oil chamber and blocks discharging of the oil pressure in the oil chamber to the outside of the oil chamber. When oil pressure is supplied into the oil chamber in which air is present, the air is exhausted to the outside of the oil chamber while the oil pressure supplied into the oil chamber is prevented from being discharged to the outside of the oil chamber by the purge valve. Consequently, the filling time of oil pressure into the oil chamber is reduced and the vibration-damping function of the tension lifter can be exhibited sufficiently at an early stage. Thus, generation of noise arising from vibration of the endless power transmission band can be suppressed. Further, even if some slack occurs with the endless power transmission band and thereupon the plunger is quickly advanced outwardly to momentarily place the oil chamber into a negative pressure state, admission of air into the oil chamber from the outside of the oil chamber is blocked by the purge valve. Consequently, the vibration-damping function of the tensioner is not deteriorated at all. Furthermore, the tensioner is assembled to an apparatus such as an internal combustion engine while it pushes the plunger into the accommodation hole. Since the tensioner lifter includes the purge valve, the plunger can be pushed into the accommodation hole while the purge valve is opened to rapidly exhaust the air in the oil chamber. Therefore, assembly of the tensioner lifter to an apparatus is facilitated.

According to the rapidly invention, the hydraulic tensioner lifter is configured such that the purge valve is built in the tensioner body. Consequently, according to the present invention, since the purge valve is built in the tensioner body, the tensioner lifter which includes the purge valve is capable of being compact.

According to the present invention, the hydraulic tensioner lifter is configured such that the purge valve is disposed outside the tensioner body and removably mounted on the tensioner body.

Consequently, since the structure of the mounting portion is made common, a purge valve of the same specifications can be applied to tensioner lifters of different models including a tensioner lifter which does not have room for the provision of a purge valve. Further, the degree of freedom of the mounting direction of the purge valve on the tensioner body increases.

As a result, according to the present invention, since the purge valve is disposed outside the tensioner body and removably mounted on the tensioner body, the purge valve can be formed from a part for universal use. Consequently, the cost of the tensioner lifter which includes the purge valve can be reduced. Further, since the degree of freedom of the mounting direction of the purge valve increases the prevention of interference with another part disposed around the tensioner lifter can be achieved readily and the degree of freedom of the layout of the tensioner lifter increases.

According to the present invention the hydraulic tensioner lifter is configured such that the oil pressure flowing into the oil chamber is lubricating oil of an internal combustion engine, and an exit of the exhaust path is communicated with an internal space of the internal combustion engine.

Consequently, air discharged from the oil chamber and containing oil components is exhausted into the internal space of the internal combustion engine and is not exhausted to the external air through the exhaust path.

As a result, according to the present invention since the oil pressure flowing into the oil chamber is lubricating oil of the internal combustion engine and the exit of the exhaust path is in communication with the internal space of the internal combustion engine and consequently air discharged from the oil chamber and containing oil components is not exhausted to the external air at all, the consumption of the lubricating oil of the internal combustion engine can be reduced and a contribution to the prevention of environmental pollution can be anticipated.

According to the present invention, the hydraulic tensioner lifter is configured such that the exit of the exhaust path is in communication with the internal space through a conduit connected to the purge valve.

Consequently, air discharged from the oil chamber and containing oil components is introduced into the internal space of the internal combustion engine through the conduit irrespective of the position at which the tensioner lifter is provided.

As a result, according to the present invention, since air exhausted from the oil chamber is introduced into the internal space through the conduit, the degree of freedom of the layout of the tensioner lifter increases.

In addition, the present invention has been made in view of such circumstances as described above, and it is an object of the present invention to provide a hydraulic tensioner lifter which can reduce the filling time of oil pressure into an oil chamber which is not in a state filled with oil pressure as a result of a decrease in the amount of oil.

It is an object or the present invention to facilitate assembly of a relief valve, which discharges oil pressure of the oil chamber to the outside of the tensioner lifter to improve the assembly property of the tensioner lifter.

It is an object of the present invention to make a plunger, to which the relief valve is compact in the assemble.

It is an object of the present invention to further reduce the filling time. It is another object of the present invention to facilitate assembly of a control valve, which supplies oil pressure into the oil chamber, to a tensioner body to improve the assembly property of the tensioner lifter. It is a further object of the present invention to facilitate the assembly property of the relief valve to the tensioner body to improve the assembly property of the tensioner lifter and make the tensioner lifter compact.

According to the present invention, a hydraulic tensioner lifter includes a tensioner body having an accommodation hole formed therein with a plunger fitted for sliding movement in the accommodation hole and cooperating with the tensioner body to define an oil chamber therebetween. A tensioner spring is disposed in the inside of the plunger within the oil chamber for biasing the plunger in an advancing direction. A control valve is provided for allowing an inflow of oil pressure into the oil chamber and blocking an outflow of the oil pressure from the oil chamber and wherein tension is applied to an endless power transmission band of a power transmission mechanism by the plunger advanced from the accommodation hole is configured such that the plunger includes a base member for fitting in the accommodation hole. An end member is integrally secured to the base member and forms an end portion of the plunger. The end member has a spring guide portion accommodated in the inside of the tensioner spring for guiding the tensioner spring.

With the hydraulic tensioner lifter, by the spring guide portion of the end member positioned in the inside of the tensioner spring disposed in the oil chamber, the set length of the tensioner spring can be increased to reduce the spring constant of the tensioner spring. Further, since the end member which is part of the plunger is utilized to guide the tensioner spring and the spring guide portion has an outer diameter a little smaller than the inner diameter of the tensioner spring, the volume of the spring guide portion can be made great, and the volume of the oil chamber can be reduced effectively.

As a result, according to the present invention, the following effects are exhibited. In particular, since the end member which composes the plunger has the spring guide portion, for guiding the tensioner spring, which is accommodated in the inside of the tensioner spring disposed in the inside of the plunger within the oil chamber, the set length of the tensioner spring can be increased to reduce the spring constant of the tensioner spring. Therefore, an appropriate tension adjustment can be achieved against a slack over a wide range of the endless power transmission band and simultaneously the plunger can be formed to be compact in the axial direction. Furthermore, since the component of the plunger is utilized, the tensioner spring can be guided without increasing the number of parts. In addition, the volume of the oil chamber can be reduced effectively. Consequently, the filling time for filling the oil chamber with oil pressure can be reduced and the vibration-damping function of the tensioner lifter can be exhibited at an early stage. Thus, the generation of noise arising from such a vibration of the endless power transmission band can be suppressed.

According to the present invention, the hydraulic tensioner lifter is configured such that the tensioner lifter includes a relief vale for discharging the oil pressure in the oil chamber to the outside of the tensioner lifter. The relief valve has an entrance path which is open directly to the oil chamber and an exit path which is open directly to the outside of the tensioner lifter and is assembled as an integrated unit part to the tensioner body or the plunger.

With the hydraulic tensioner lifter, since the entrance path of the relief valve directly faces the oil chamber and the exit path of the relief valve directly faces the outside of the tensioner lifter, there is no necessity to form an oil path for connecting the relief valve to the oil chamber and the outside of the tensioner lifter in the tensioner body or the plunger. Further, since the relief valve is a unit part, assembly of the relief valve to the tensioner body or the plunger is facilitated.

As a result, according to the present invention, the following effects are exhibited, in particular, since the relief valve has the entrance path which is open directly to the oil chamber and the exit path which is open directly to the outside of the tensioner lifter, there is no necessity to form an oil path for connecting the relief valve to the oil chamber and the outside of the tensioner lifter in the tensioner body or the plunger. Consequently, the tensioner lifter becomes compact. Further, since the relief valve is assembled as an integrated single unit part to the tensioner body or the plunger, assembly of the relief valve is facilitated, and consequently, the assembly property of the tensioner lifter is improved.

According to the present invention, the hydraulic tensioner lifter is configured such that the end member is the relief valve assembled to the plunger.

With the hydraulic tensioner lifter, the end member itself serves as the relief valve and part of the relief valve is accommodated in the inside of the plunger spring.

As a result, according to the present invention, the following effect is exhibited in particular, since the end member is the relief valve assembled to the plunger, the end member itself serves as the relief valve and part of the relief valve is accommodated in the inside of the plunger spring. Therefore, the plunger to which the relief valve is assembled becomes further compact.

According to the present invention, the hydraulic tensioner lifter is configured such that part of the control valve is accommodated in the inside of the plunger within an overall range of movement of the plunger.

With the hydraulic tensioner lifter, since the control valve is positioned in the inside of the plunger and extends over the overall range of movement of the plunger, the volume of the control valve can be increased and the volume of the oil chamber can be reduced effectively by the control valve.

As a result, according to the present invention, the following effect is exhibited in particular, since part of the control valve is accommodated in the inside of the plunger within the overall range of movement of the plunger, the volume of the oil chamber can be reduced effectively by the control valve. Consequently, the filling time of oil pressure into the oil chamber can be further reduced and the vibration-damping function of the tensioner lifter can be exhibited at an earlier stage. Consequently, generation of noise arising from vibration of the endless power transmission band can be further suppressed.

According to the present invention, the hydraulic tensioner lifter is configured such that the tensioner body is composed of a first body and a second body, and the control valve is formed from the second body and is assembled as an integrated single unit part to the first body.

With the hydraulic tensioner lift, since the control valve is the second body itself which includes part of the tensioner body and is a unit part, assembly of the control valve to the first body is facilitated.

As a result, according to the present invention, the following effect is exhibited in particular, since the control valve is formed from the second body which includes the tensioner body and is assembled as an integrated single unit part to the first body which forms the tensioner body, the control valve is the second body itself, and therefore, the tensioner lifter can be made compact and assembly of the control valve to the first body is facilitated. Consequently, the assembly property of the tensioner lifter is improved.

According to the present invention, the hydraulic tensioner lifter is configured such that the tensioner lifter includes a relief valve having an exit path for directly releasing oil pressure in the oil chamber to an oil path on the upstream side with respect to a valving element of the control valve, and the relief valve is assembled as an integrated single unit part to the tensioner body.

With the hydraulic tensioner lifter, when it is tried to take a countermeasure for preventing oil pressure discharged from the relief valve from being discharged to the outside of the tensioner lifter, there is no necessity to form an oil path for exclusive use for discharging oil pressure from the relief valve because the exit path of the relief valve directly faces the oil path for supplying oil pressure into the oil chamber. Further, since the relief valve is a unit part, assembly of the relief valve to the tensioner body is facilitated.

As a result, according to the present invention, the following effects are exhibited in particular, since the tensioner lifter includes the relief valve having the exit path which directly releases oil pressure in the oil chamber to the oil path on the upstream side with respect to the valving element of the control valve, when it is tried to take a countermeasure for preventing oil pressure discharged from the relief valve from being discharged to the outside of the tensioner lifter, there is no necessity to form an oil path for exclusive use for discharging oil pressure from the relief valve, and therefore, the tensioner lifter becomes compact. Further, since the relief valve is assembled as an integrated single unit part to the tensioner body, assembly of the relief valve to the tensioner body is facilitated, and consequently, the assembly property of the tensioner lifter is improved.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

In the following, embodiments of the present invention are described with reference to FIGS. 1 to 9.

Figure 1:
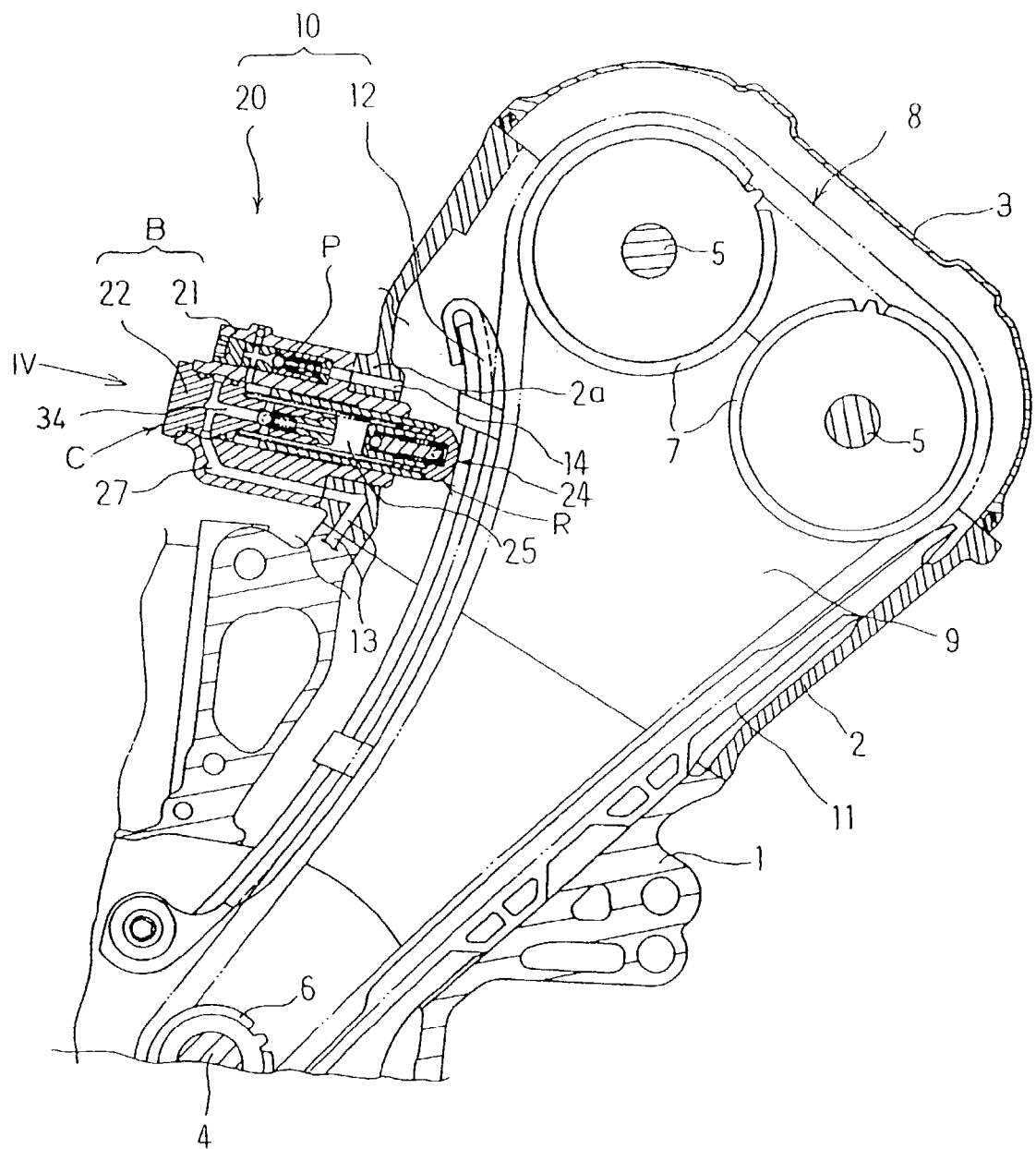
FIG. 1 shows a first embodiment of the present invention and is a sectional view of the essential part of an internal combustion engine of the DOHC type wherein a hydraulic tensioner lifter according to the present invention is used for a tensioner of a timing chain which provides a power transmission mechanism for valve motion.

FIGS. 1 to 6 show a first embodiment of the present invention. FIG. 1 is a sectional view of essential part of an internal combustion engine of the DOHC type wherein a hydraulic tensioner lifter 20 of the present invention is applied to a tensioner for a timing chain 8 which forms a power transmission mechanism for a valve motion. The internal combustion engine includes a cylinder block 1 coupled to an upper end of a crankcase (not shown) and having a cylinder that has a cylinder axis inclined with respect to a horizontal plane, and a cylinder head 2 with a head cover 3 placed in this order on the cylinder block 1.

In a crank chamber defined by the crankcase and the cylinder block 1, a crankshaft 4 is supported for rotation on a main bearing held between the crankcase and the cylinder block 1 with a valve motion chamber defined by the cylinder head 2 and the head cover 3. A pair of camshafts 5 are supported for rotation on the cylinder head 2.

The camshafts 5 are provided in a pair that are driven to rotate at a speed equal to one half that of the crankshaft 4 by power of the crankshaft 4 transmitted through the power transmission mechanism. The power transmission mechanism includes a driving sprocket wheel 6 coupled to the crankshaft 4, a pair of driven sprocket wheels 7 coupled to the camshafts 5, and a timing chain 8 which is a flexible endless transmission band extending between and around the driving sprocket wheel 6 and the driven sprocket wheels 7. The power transmission mechanism is accommodated in a power transmission chamber 9 defined by an engine body composed of the cylinder block 1, cylinder head 2 and head cover 3 and a power transmission cover (not shown) coupled to a side face of the engine body.

A tensioner 10 for applying suitable tension to the timing chain 8 has operating contacts with the loose side of the timing chain 8 while a chain guide 11 contacts with the tight side of the timing chain 8. The tensioner 10 includes a tensioner slipper 12 pivotally supported at an end thereof on the cylinder block 1 for contacting with the outer periphery side of the timing chain 8, and a hydraulic tensioner lifter 20 secured to the cylinder head 2 for pressing a portion rather near to the other end of the tensioner slipper 12 to exert a pressing force for pressing the tensioner slipper 12 against the timing chain 8.

Figure 2:
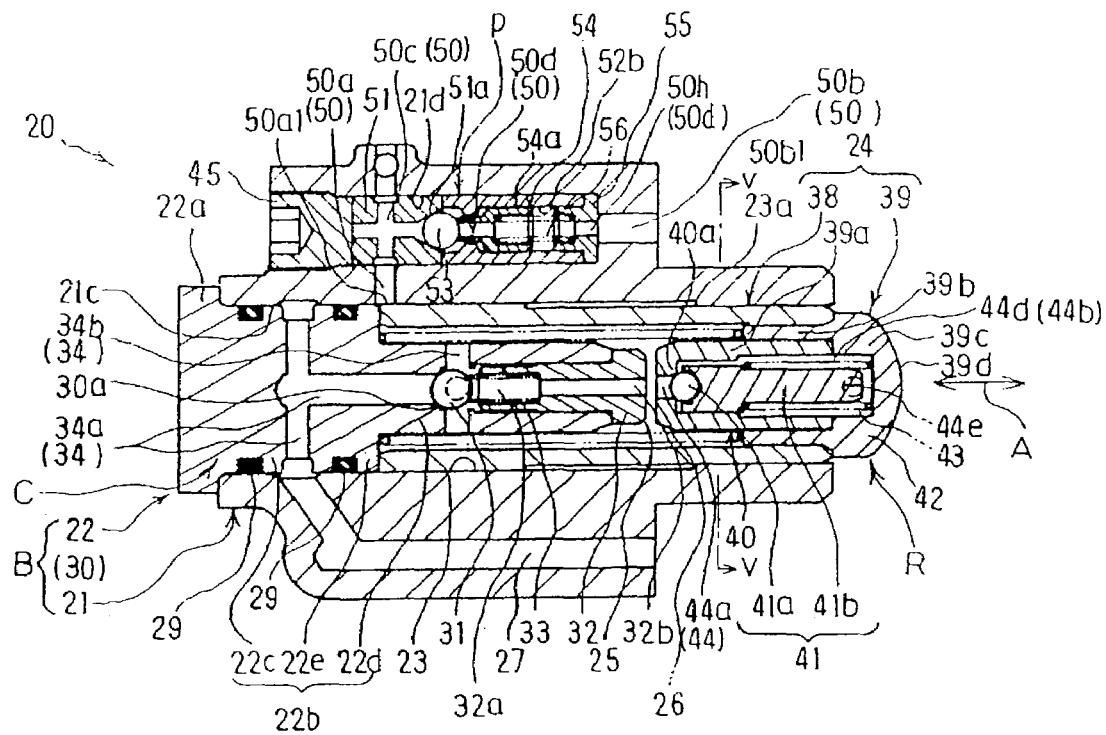
FIG. 2 is a sectional view substantially taken along line II—II of FIG. 4.
Figure 3:
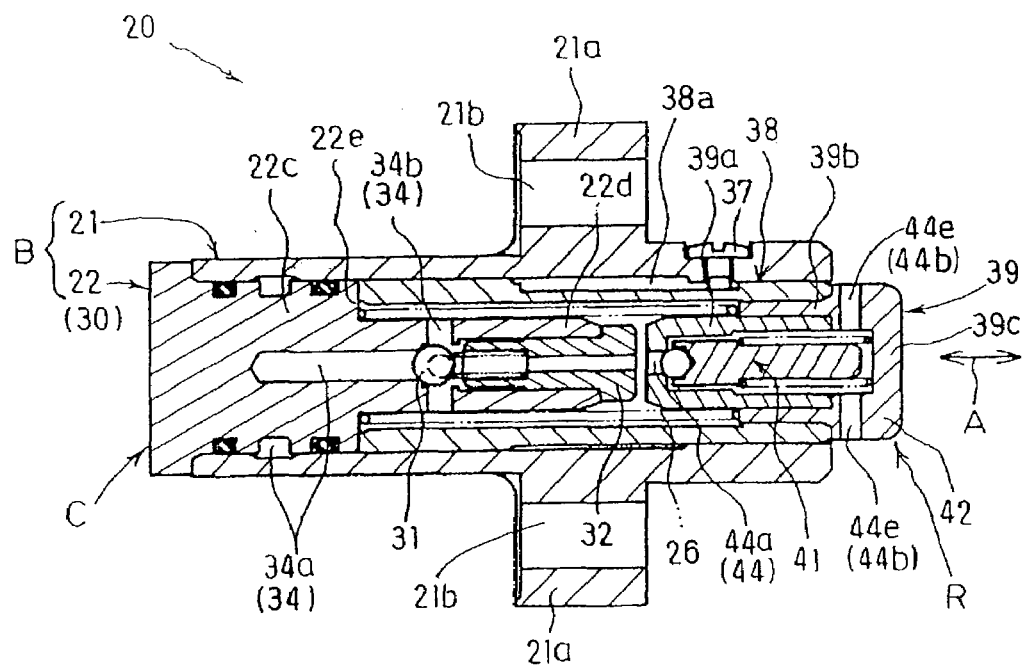
FIG. 3 is a sectional view substantially taken along line III—III of FIG. 4.
Figure 4:
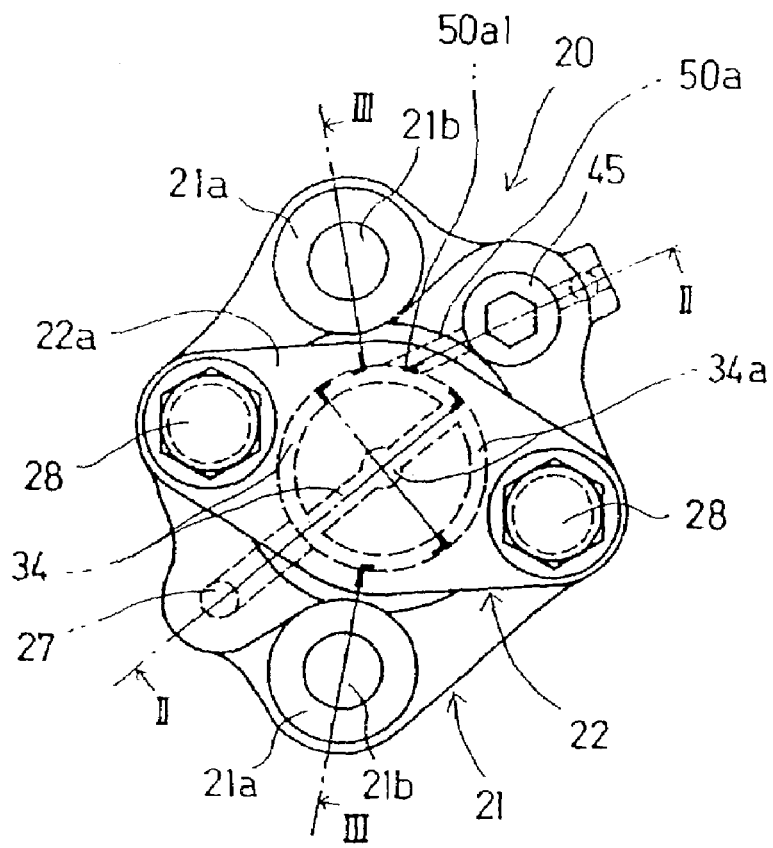
FIG. 4 is a view of the tensioner lifter of FIG. 1 as viewed in the direction indicated by an arrow mark IV.
Figure 5:
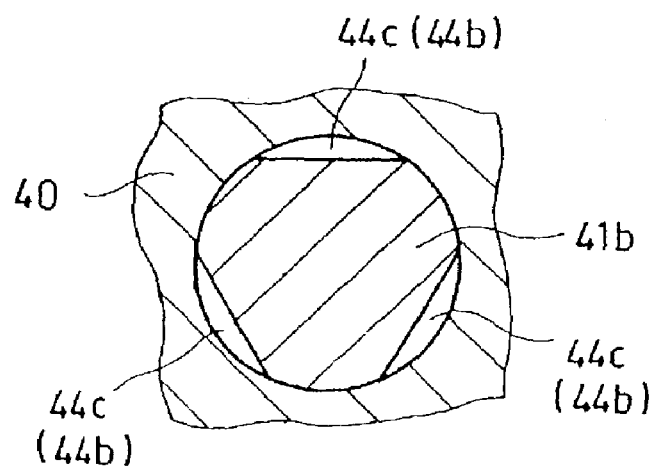
FIG. 5 is a sectional view taken along line V—V of FIG. 2.
Figure 6A:
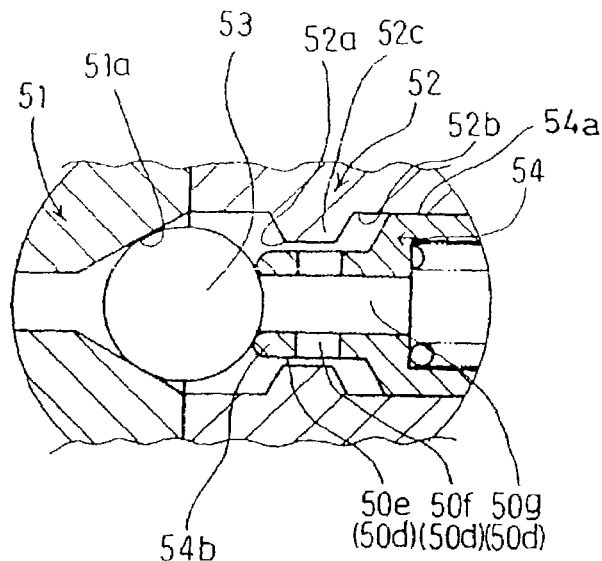
FIGS. 6(a)–6(c) are enlarged views of essential part of an air-bleeder valve of FIG. 2, and wherein 6(a) shows a state wherein a valving element is seated on a first valve seat, 6(b) shows another state wherein the valving element is spaced away from the first valve seat and a second valve seat, and 6(c) shows a further state wherein the valving element is seated on the second valve seat.
Figure 6B:
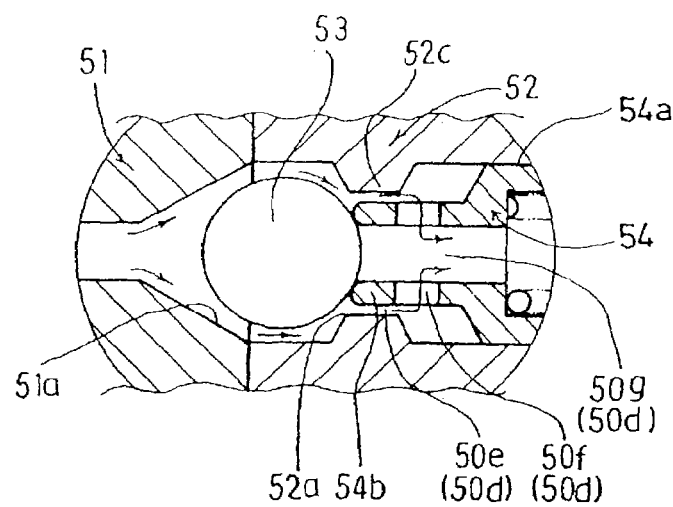
Figure 6C:
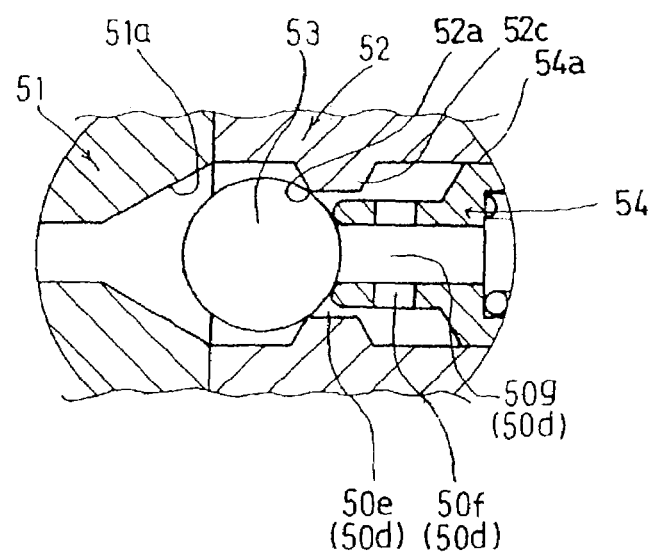

Referring also to FIGS. 2 to 4, the tensioner lifter 20 includes a tensioner body B having a cylindrical bottom accommodation hole 23 formed therein and secured to a mounting seat 2a formed on the cylinder head 2 by means of bolts fitted in a pair of insertion holes 21b formed in a boss portion 21a of a first body 21 hereinafter described. A plunger 24 is fitted for sliding movement in the accommodation hole 23 in such a state that an end portion thereof projects from an open end of the accommodation hole 23. An oil chamber 25 is formed between the tensioner body B and the plunger 24 in the accommodation hole 23 for being filled with an oil pressure supplied thereto through a control valve hereinafter described. A tensioner spring 26 in the form of a cylindrical compression coil spring is disposed between the tensioner body B and the plunger 24 in a state wherein it is accommodated at the inside of the plunger 24 within the oil chamber 25 for biasing the cylindrical plunger 24 in a direction in which it advances outwardly from the accommodation hole 23 in an axial direction A. A check valve C serves as a control valve for permitting an inflow of oil pressure into the oil chamber 25 on the one hand but for blocking an outflow of the oil pressure from the oil chamber 25 on the other hand. A relief valve R is provided for discharging the oil pressure within the oil chamber 25 to the outside of the oil chamber 25. An air-bleeder mechanism is provided for discharging air in the oil chamber 25 to the outside of the oil chamber 25.

The tensioner body B is composed of a first body 21 in which a through-hole 21c is formed for forming the accommodation hole 23. A second body 22 is provided in the form of a plug serving as a bottom portion of the accommodation hole 23 for closing up one of the open ends of the through-hole 21c for forming the bottomed accommodation hole 23.

The first body 21 has a tensioner side feed oil path 27 formed therein which is connected to a feed oil path 13 (refer to FIG. 1) on the engine side provided in the engine body described hereinabove on the seat face of the mounting seat 2a. The feed oil path 13 is formed from oil paths formed in the cylinder head 2 and the cylinder block 1 and is in communication with an oil pump which is driven by power of the crankshaft 4. Therefore, the oil pump constructs a hydraulic source which is rendered operative and inoperative in response to activation and deactivation of the internal combustion engine. Oil pressure of a high pressure discharged from the oil pump is supplied as lubricating oil to various places to be lubricated on the internal combustion engine and is further supplied to the oil chamber 25 through the feed oil paths 13, 27 and 34.

The second body 22 is a unitary member formed from a flange portion 22a (refer to FIG. 4) extending outwardly in a diametrical direction on the outer side of the through-hole 21c, and a stepped cylindrical tubular portion 22b fitted in the through-hole 21c coaxially with an axial line of the through-hole 21c. A pair of bolts 28 for securing the second body 22 to the first body 21 are fitted in the flange portion 22a. The tubular portion 22b is a unitary member formed from a large diameter portion 22c fitted oil-tight in the through-hole 21c, a small diameter portion 22d having a diameter smaller than that of the large diameter portion 22c, and a stepped portion 22e at which the large diameter portion 22c and the small diameter portion 22d are connected to each other and which defines the bottom portion of the accommodation hole 23.

Further, the check valve C for controlling the amount of oil pressure to be supplied from the feed oil paths 13 and 27 into the oil chamber 25 when the internal combustion engine operates is provided in the second body 22. The check valve C includes a valve body 30 composed of the second body 22 itself, a ball-shaped valving element 31 accommodated in the small diameter portion 22d of the valve body 30 capable of being seated on a valve seat 30a of the valve body 30, a spring receiver 32 press fitted in the valve body 30 from the end portion side of the valve body 30 and secured to the small diameter portion 22d, a valve spring 33 in the form of a compression coil spring disposed between the valving element 31 and the spring receiver 32 for biasing the valuing element 31 in a valve opening direction so that the valving element 31 may be seated on the valve seat 30a, and a tensioner side feed oil path 34 formed in the valve body 30 for communicating the feed oil path 27 and the oil chamber 25 with each other and for being opened and closed by the valving element 31. Therefore, the check valve C is assembled as an integrated single unit part to the first body 21.

The spring receiver 32 has a recessed portion 32a formed therein for accommodating the valve spring 33 and for holding and guiding the valve spring 33 with an oil path 32b formed therein which extends from the recessed portion 32a toward an end portion thereof for reducing the back pressure of the valuing element 31. The feed oil path 34 includes an entrance path 34a on the upstream side with respect to the valving element 31 and an exit path 34b on the downstream side with respect to the valving element 31, and the entrance path 34a and the feed oil path 27 form an oil path on the upstream side with respect to the valving element 31. The entrance path 34a is connected to the feed oil path 27 at an outer circumferential face of the large diameter portion 22c between a pair of annular seal members 29 disposed in a spaced relationship from each other in the axial direction A. The exit path 34b extends in diametrical directions perpendicular to each other and is open to the oil chamber 25 at an outer circumferential face of the small diameter portion 22d.

An end portion of the tensioner spring 26 and the stepped portion 22e with which the plunger 24 at the most retracted position forms a spring receiver and forms a stopper which defines the most retracted position of the plunger 24 which moves back and forth in the axial direction A. The tensioner spring 26 which contacts at one end thereof with the second body 22 and at the other end thereof with the plunger 24 is disposed such that it defines small diametrical gaps with the small diameter portion 22d and the plunger 24 in the diametrical direction. Therefore, the small diameter portion 22d has an outer diameter a little smaller than the inner diameter of the tensioner spring 26 and serves as a spring guide which guides the tensioner spring 26 to prevent buckling of the tensioner spring 26.

Furthermore, the length of the small diameter portion 22d in the axial direction A is set such that the small diameter portion 22d and the spring receiver 32 which projects from the end portion of the small diameter portion 22d may overlap with the plunger 24 in the axial direction A over an overall range of movement of the plunger 24 in the axial direction A. That is, the spring receiver 32 may be included in the inside of the plunger 24. Then, the outer diameter of the spring receiver 32 is set a little smaller than the outer diameter of the small diameter portion 22d so that the spring receiver 32 may occupy a comparatively great volume in the oil chamber 25.

The plunger 24 which presses the tensioner slipper 12 against the timing chain 8 with the resilient force of the tensioner spring 26 and the hydraulic pressure of the oil chamber 25 is composed of a cylindrical base member 38 fitted in the accommodation hole 23 and open at the opposite ends thereof, and an end member 39 force fitted in the inside of the base member 38 from an end portion of the base member 38 so as to be secured integrally to the base member 38 and closing up the open end of the base member 38. Further, a screw 37 is screwed in the first body 21 and engaged with a groove 38a formed on an outer periphery of the base member 38 of the plunger 24 that extends in the axial direction A. The screw 37 is engaged with the groove 38a to form a turning motion preventing member for preventing turning motion of the plunger 24.

The end member 39 has a spring guide portion 39a disposed in the inside of the tensioner spring 26 and having an outer diameter a little smaller than the inner diameter of the tensioner spring 26 such that it is accommodated in the tensioner spring 26. A cylindrical fitting portion 39b is provided which is a portion force fitted in the base member 38. A contacting portion 39c is provided having a contacting face 39d for contacting with the tensioner slipper 12 and assuming a position at which it projects from the first body 21 at the most retracted position described above. Since the other end of the tensioner spring 26 contacts with an end portion of the fitting portion 39b, the end member 39 serves also as a spring receiver for the tensioner spring 26.

In the present first embodiment, the end member 39 is the relief valve R. More particularly, the relief valve R includes a valve body 40 force fitted in the inside of the fitting portion 39b of a spring receiver 42 which is hereinafter described such that it projects in the axial direction A from the fitting portion 39b towards the check valve C and having the spring guide portion 39a. A valving element 41 is accommodated in the valve body 40 and is capable of being seated on a valve seat 40a of the valve body 40. A valve spring 43 in the form of a compression coil spring is disposed between the spring receiver 42 having the fitting portion 39b and the contacting portion 39c. The valving element 41 is provided for biasing the valving element 41 in a valve closing direction so that the valving element 41 may be seated on the valve seat 40a. A discharge path 44 is formed in the valve body 40 with the valving element 41 and spring receiver 42 for communicating the oil chamber 25 and the power transmission chamber 9 with each other and for being opened and closed by the valving element 41. Therefore, the relief valve R is assembled as an integrated single unit part to the plunger 24. Here, the power transmission chamber 9 is outside the tensioner lifter 20 and further is an internal space of the internal combustion engine.

The valve body 40 having an outer diameter substantially equal to the outer diameter of the small diameter portion 22d is opposed to the spring receiver 32 with a small gap left therebetween in the axial direction 24 when the plunger 24 assumes the most retracted position.

The valving element 41 is composed of an opening and closing element 41a formed from a spherical member seated on the valve seat 40a with a cylindrical valve guide 41b having the opening and closing element 41a fixedly force fitted therein. The valve guide 41b has a recessed portion formed thereon. Oil paths 44c (refer to FIG. 5) are provided along which oil pressure flowing in from an entrance path 44a flows. The oil paths 44c are formed between the recessed portion and the valve body 40.

The discharge path 44 is composed of an entrance path 44a on the upstream side with respect to the valving element 41 and an exit path 44b on the downstream side with respect to the valving element 41. The entrance path 44a is open to a face opposing to the spring receiver 32 in the axial direction A such that it is directly open to the oil chamber 25. The exit path 44b is formed from the oil paths 44c, an accommodation chamber 44d for the valve spring 43 formed across the valve body 40 and the spring receiver 42, and an oil path 44e formed in the spring receiver 42 and open to an outer face of the contacting portion 39c such that it is directly open to the power transmission chamber 9.

The set load of the valve spring 43 which determines the valve opening pressure of the valving element 41 is set wherein if an excessively high oil pressure exceeding an allowable value set from the point of view of securing a required durability of the tensioner 10 and the timing chain 8 when the timing chain 8 is tightened and the load for retracting the plunger 24 acts from the timing chain 8 upon the plunger 24 through the tensioner slipper 12, flows into the oil chamber 25, the valving element 41 is spaced away from the valve seat 40a to open the discharge path 44 so that the oil pressure in the oil chamber 25 may be discharged into the power transmission chamber 9 through the exit path 44b.

Further, when the plunger 24 assumes the most retracted position, the check valve C and the relief valve R are opposed to each other with a small gap left therebetween in the axial direction A as described above and besides being positioned slightly inward of the tensioner spring 26 as shown in FIGS. 2 and 3, functions as a volume adjusting member for decreasing the volume of the oil chamber 25 to the utmost.

Referring to FIGS. 1, 2 and 6(a)–6(c), the air-bleeder mechanism described above includes a purge valve P built in the first body 21 and accommodated in a cylindrical accommodation hole 21d formed in the first body 21 such that it has an axial line parallel to the through-hole 21c and is open to the same side of the first body 21. A discharge path 50 is formed in the tensioner lifter 20 and opened and closed by a valving element of the purge valve P. The discharge path 50 has an inflow path 50a and an outflow path 50b formed in the first body 21 across the purge valve P. The inflow path 50a has an entrance 50a1 positioned at an uppermost portion of the oil chamber 25, and an exit 50b1 of the outflow path 50b is connected at a seat face of the mounting seat 2a to a discharge path 14 which is formed in the mounting seat 2a and is open in the power transmission chamber 9 such that it is in communication with the power transmission chamber 9 through the discharge path 14.

The purge valve P secured in the accommodation hole 21d by a plug 45 that is screwed in an oil-tight manner in an open end portion of the accommodation hole includes a first valve body 51 for contacting with the plug 45, a second valve body 52 for contacting with the first valve body 51, a spherical valving element 53 accommodated between the contacting portions of the first valve body 51. The second valve body 52 is capable of being seated on a first valve seat 51a of the first valve body 51. A second valve seat 52a of the second valve body 52 is provided with a valve guide 54 fitted for sliding movement in an accommodation hole 52b formed in the second valve body 52 for contacting with the valving element 53. A spring receiver 55 is fixedly force fitted in the second valve body 52 with a valve spring 56 disposed between the valve guide 54 and the spring receiver 55 for biasing the valving element 53 in a valve closing direction so that the valving element 53 is seated on the first valve seat 51a through the valve guide 54 (refer to (A) of FIG. 6). A valve internal discharge path is formed from an entrance path 50c formed in the first valve body 51 and is connected to the inflow path 50a and an exit path 50d formed in the second valve body 52 with a valve guide 54 and spring receiver 55 and connected to the outflow path 50b.

The valving element 53 can be seated on the second valve seat 52a against the resilient force of the valve spring 56 by hydraulic pressure of oil pressure flowing in from the oil chamber 25 through the inflow path 50a and the entrance path 50c when the oil pressure is supplied into the oil chamber 25 so that the plunger 24 assumes its advanced position (refer to FIG. 1). Therefore, the set load of the valve spring 56 is set to such a value that, when pneumatic pressure (hereinafter referred to as "valve opening pressure") of air in the oil chamber 25 is pushed out into the inflow path 50a and the entrance path 50c by oil pressure supplied into the oil chamber 25 through the check valve C acts upon the valving element 53, the valving element 53 is spaced away from the first valve seat 51a to open the valve (refer to (B) of FIG. 6). However, when hydraulic pressure (hereinafter referred to as "valve closing pressure"), higher than the pneumatic pressure, of oil pressure supplied into the oil chamber 25 acts upon the valving element 53, the valving element 53 is seated on the second valve seat 52a to close the valve (refer to FIG. 1 and (C) of FIG. 6). Then, when the hydraulic pressure acts upon the valving element 53 in this manner, the oil pressure having a density and a viscosity much higher than the density and viscosity of the air collides with the valving element 53, whereupon the valving element 53 is immediately seated on the second valve seat 52a. It is to be noted that it has been proved from the results of an experiment that, in the first embodiment of the present invention, by setting the set load of the valve spring 56 to a value equal to that of the set load of the valve spring 33 of the check valve C, a preferable result is obtained in regard to the exhaust characteristic of air from the oil chamber 25 and the outflow preventing characteristic of oil pressure.

Therefore, even if pressure lower than the valve opening pressure or higher than the valve closing pressure is applied, the discharge path 50 remains in a state closed with the valving element 53, but with any other pressure, the valving element 53 is spaced away from the first valve seat 51a and the second valve seat 52a (refer to (B) of FIG. 6) and the discharge path 50 is in another state opened by the valving element 53.

Further, since the valving element 53 is normally biased in the valve closing direction by the valve spring 56, admission of air in the power transmission chamber 9 into the entrance path 50c and the inflow path 50a through the exit path 50d and further into the oil chamber 25, that is, backflow of air through the discharge path 50, is blocked by the valving element 53.

Therefore, the purge valve P is a valve having a check valve function of permitting exhaustion of air in the oil chamber 25 into the power transmission chamber 9 on the one hand but blocking admission of air from the power transmission chamber 9 into the oil chamber 25 on the other hand.

The valve guide 54 in the form of a stepped cylindrical member has a sliding portion 54a of a large diameter capable of contacting for sliding movement at an overall outer circumferential face thereof with a wall face of the accommodation hole 52b of the second valve body 52, and an insertion portion 54b of a small diameter capable of being inserted in a hole of a valve seat formation portion 52c having the second valve seat 52a. A gap 50e is formed between the insertion portion 54b and the valve seat formation portion 52c such that it extends in a diametrically outer direction of the insertion portion 54b over a circumferential direction thereof. The gap 50e is in communication with a hollow portion 50g of the valve guide 54 through a diametrical flow path 50f formed in the insertion portion 54b. The hollow portion 50g is in communication with the outflow path 50b through the accommodation hole 52b and a flow path 50h formed in the spring receiver 55. Therefore, the exit path 50d is composed of the gap 50e, flow path 50f, hollow portion 50g, accommodation hole 52b and flow path 50h.

Further, the discharge path 50 formed in the tensioner lifter 20 is formed from the inflow path 50a, the valve internal discharge path formed from the entrance path 50c and the exit path, and the outflow path 50b.

Subsequently, the operation and effects of the first embodiment having the configuration described above are described.

During operation of the internal combustion engine during which the oil chamber 25 is filled with oil pressure, if some slack occurs with the running timing chain 8, then the plunger 24 is advanced outwardly from the accommodation hole 23 by the resilient force of the tensioner spring 26 and the oil pressure in the oil chamber 25 decreases. Consequently, the check valve C is opened, and the oil pressure flows through the feed oil paths 13, 27 and 34 into the oil chamber 25 and applies tensile force to the timing chain 8. On the other hand, if the timing chain 8 becomes tightened and a load for retracting the plunger 24 acts upon the plunger 24 from the timing chain 8, then the oil pressure in the oil chamber 25 blocks the retreating movement of the plunger 24 to suppress vibration of the timing chain 8 thereby to suppress generation of noise arising from such vibration.

Incidentally, while the internal combustion engine stops, no oil pressure is supplied into the oil chamber 25. Consequently, the oil pressure in the oil chamber 25 gradually leaks through a very small gap of the tensioner lifter 20 such as a gap between the sliding portions of the plunger 24 and the tensioner body B, whereupon the amount of the oil in the oil chamber 25 decreases and air is admitted into the oil chamber 25.

If the internal combustion engine is started to operate the oil pump while the oil chamber 25 is not filled with oil pressure in this manner, then the oil pressure of a high pressure discharged from the oil pump passes through the feed oil paths 13, 27 and 34 and the check valve C and is supplied into the oil chamber 25 which is in a state wherein the oil amount has reduced and air resides.

Further, since the spring guide portion 39a is formed making use of the end member 39 which is a component of the plunger 24, the tensioner spring 26 can be guided without an increase in the number of parts. Further, since the spring guide portion 39a which is part of the relief valve R is accommodated in the inside of the tensioner spring 26, the set length of the tensioner spring 26 can be increased to reduce the spring constant of the tensioner spring 26. Therefore, appropriate tension adjustment can be achieved against a slack over a wide range of the timing chain 8 and simultaneously the plunger 24 can be formed compact in the axial direction A.

Since the air-bleeder mechanism described above includes the purge valve P having the valving element 53 for opening and closing the discharge path 50 which introduces air in the oil chamber 25 into the power transmission chamber 9 and the purge valve P has a check valve function of permitting the exhaustion of air in the oil chamber 25 into the power transmission chamber 9 on the one hand but preventing the admission of air from the power transmission chamber 9 into the oil chamber 25 on the other hand. When oil pressure is supplied into the oil chamber 25 in which air is present by blocking the exhaustion of oil pressure in the oil chamber 25 into the power transmission chamber 9, the purge valve P allows the air in the oil chamber 25 to be exhausted into the power transmission chamber 9 through the inflow path 50a which is open to the uppermost portion of the oil chamber 25 while oil pressure having been supplied into the oil chamber 25 is not discharged. Accordingly, the filling time of oil pressure into the oil chamber 25 can be reduced and the vibration-damping function of the tensioner lifter 20 can be exhibited sufficiently at an early stage. Consequently, generation of noise arising from such vibration of the timing chain 8 can be suppressed. Further, even if some slack appears with the timing chain 8 and the plunger 24 is suddenly advanced outwardly until the oil chamber 25 is momentarily brought into a negative pressure state from the relationship to the viscosity of the oil pressure and the oil feeding rate into the oil chamber 25, since admission of air into the oil chamber 25 from the power transmission chamber 9 is blocked by the purge valve P, the vibration-damping function of the tensioner lifter 20 is not deteriorated at all. Furthermore, since the tensioner lifter 20 is assembled to the internal combustion engine while pushing the plunger 24 into the accommodation hole 23 against the resilient force of the tensioner spring 26 and the tensioner lifter 20 includes the purge valve P, the purge valve P can be opened to rapidly exhaust the air in the oil chamber 25 while the plunger 24 is pushed into the accommodation hole 23. Consequently, the assembly of the tensioner lifter 20 to the internal combustion engine is facilitated.

Since the purge valve P is built in the tensioner body B, the tensioner lifter 20 which includes the purge valve P can be formed to be compact. Besides, since the accommodation hole 21d in which the purge valve P is accommodated has an axial line parallel to the through-hole 21c in which the check valve C is assembled and is open to the same side of the first body 21, the purge valve P and the check valve C can be assembled in the same direction to the first body 21. Consequently, the assembly property of the tensioner lifter 20 is improved also in this regard.

Since the exit 50b1 of the discharge path 50 which is opened and closed with the purge valve P is in communication with the power transmission chamber 9 of the internal combustion engine through the discharge path 14, air exhausted from the oil chamber 25, into which oil pressure in the form of lubricating oil of the internal combustion engine is supplied, and containing oil components therein is exhausted into the power transmission chamber 9 but is not exhausted into the external air. Consequently, the consumption of lubricating oil of the internal combustion engine can be reduced and in addition a contribution to the prevention of environmental pollution can be anticipated. In addition, since the exit 50b1 of the outflow path 50b is connected to the seat face of the mounting seat 2a to which the tensioner lifter 20 is attached and which is open to the power transmission chamber 9, a pipe system for exhausting the air from the oil chamber 25 into the power transmission chamber 9 is not required. Consequently, a contribution to a compact layout of parts disposed around the tensioner lifter 20 can be anticipated.

The spring guide portion 39a is part of the end member 39 including the plunger 24 and is accommodated in the inside of the tensioner spring 26 disposed in the inside of the plunger 24 within the oil chamber 25 for guiding the tensioner spring 26 and is present in the oil chamber 25. Since the spring guide portion 39a has an outer diameter a little smaller than the inner diameter of the tensioner spring 26 in order to guide the tensioner spring 26 and accordingly can make the volume greater, the volume of the oil chamber 25 can be reduced effectively. Therefore, the filling time for filling the oil chamber 25 with oil pressure can be reduced and the vibration-damping characteristic of the tensioner lifter 20 can be exhibited at an early stage to suppress generation of noise arising from such vibration of the timing chain 8. Further, since the spring guide portion 39a is formed making use of the end member 39 which is a component of the plunger 24, the tensioner spring 26 can be guided without increase of the number of parts.

Meanwhile, since the small diameter portion 22d which is part of the valve body 30 (second body 22) of the check valve C is accommodated in the inside of the plunger 24 within the overall range of movement of the plunger 24 such that it extends over the overall range of movement of the plunger 24, the volume of the small diameter portion 22$d$ can be made great and the volume of the oil chamber 25 can be reduced effectively with the check valve C. As a result, the filling time of oil pressure into the oil chamber 25 can be further reduced and the vibration-damping function of the tensioner lifter 20 can be exhibited at an early stage. Thus, the generation of noise arising from such vibration of the timing chain 8 can be further suppressed. Further, since the small diameter portion 22$d$ preferably has an outer diameter a little greater than the inner diameter of the tensioner spring 26 and serves also as a spring guide for the tensioner spring 26, and further since, when the plunger 24 assumes the most retracted position described above, the check valve C and the relief valve R which is the end member 39 are opposed to each other with a small gap left therebetween, the volume of the oil chamber 25 can be reduced to the utmost to reduce the filling time of oil pressure into the oil chamber 25 to the utmost.

Since the relief valve R has the entrance path 44$a$ which is directly open to the oil chamber 25 and the exit path 44$b$ which is directly open to the power transmission chamber 9 which is the outside of the tensioner lifter 20, the entrance path 44$a$ of the relief valve R directly faces the oil chamber 25 while the exit path 44$b$ of the relief valve R directly faces the power transmission chamber 9. Accordingly, there is no necessity to form an oil path for connecting the relief valve R to the oil chamber 25 and the power transmission chamber 9, and consequently, the tensioner lifter 20 becomes compact. Further, since the relief valve R is assembled as a unit part to the plunger 24, assembly of the relief valve R is facilitated. Consequently, the assembly property of the tensioner lifter 20 is improved.

Furthermore, since the end member 39 which composes the plunger 24 is the relief valve R assembled to the plunger 24, the end member 39 itself serves as the relief valve R. In addition, since part of the relief valve R is accommodated in the inside of the tensioner spring 26, the plunger 24 to which the relief valve R is assembled becomes further compact in the axial direction A.

Since the check valve C is composed of the second body 22 which composes the tensioner body B, the second body 22 itself serves as the check valve C, and therefore, the tensioner lifter 20 can be made more compact. In addition, since the check valve C is assembled as an integrated single unit part to the first body 21 which includes the tensioner body B, assembly of the check valve C to the first body 21 is facilitated. Consequently, the assembly property of the tensioner lifter 20 is improved.

Subsequently, a second embodiment of the present invention is described with reference to FIGS. 7 to 9 together with FIG. 6. The second embodiment is different from the first embodiment principally in the tensioner body and the air-bleeder mechanism of the hydraulic tensioner lifter but has basically the same configuration except for this. Therefore, description of the common elements is omitted or given very simply, and principally the difference is described. It is to be noted that like elements or corresponding elements to those of the first embodiment are denoted by like reference characters.

A tensioner body B1 includes first and second bodies 21$_1$ and 22. The second body 22$_1$ is secured to the first body 21$_1$ by bolts 35 fitted in a flange portion 22$_1$$a$ and has a connection portion 22$_1$$f$ formed therein as a threaded hole to which an oil pipe 36 which forms a feed oil path 36$a$ for supplying oil pressure to an entrance path of a check valve C1 is connected through a coupling.

Figure 7:
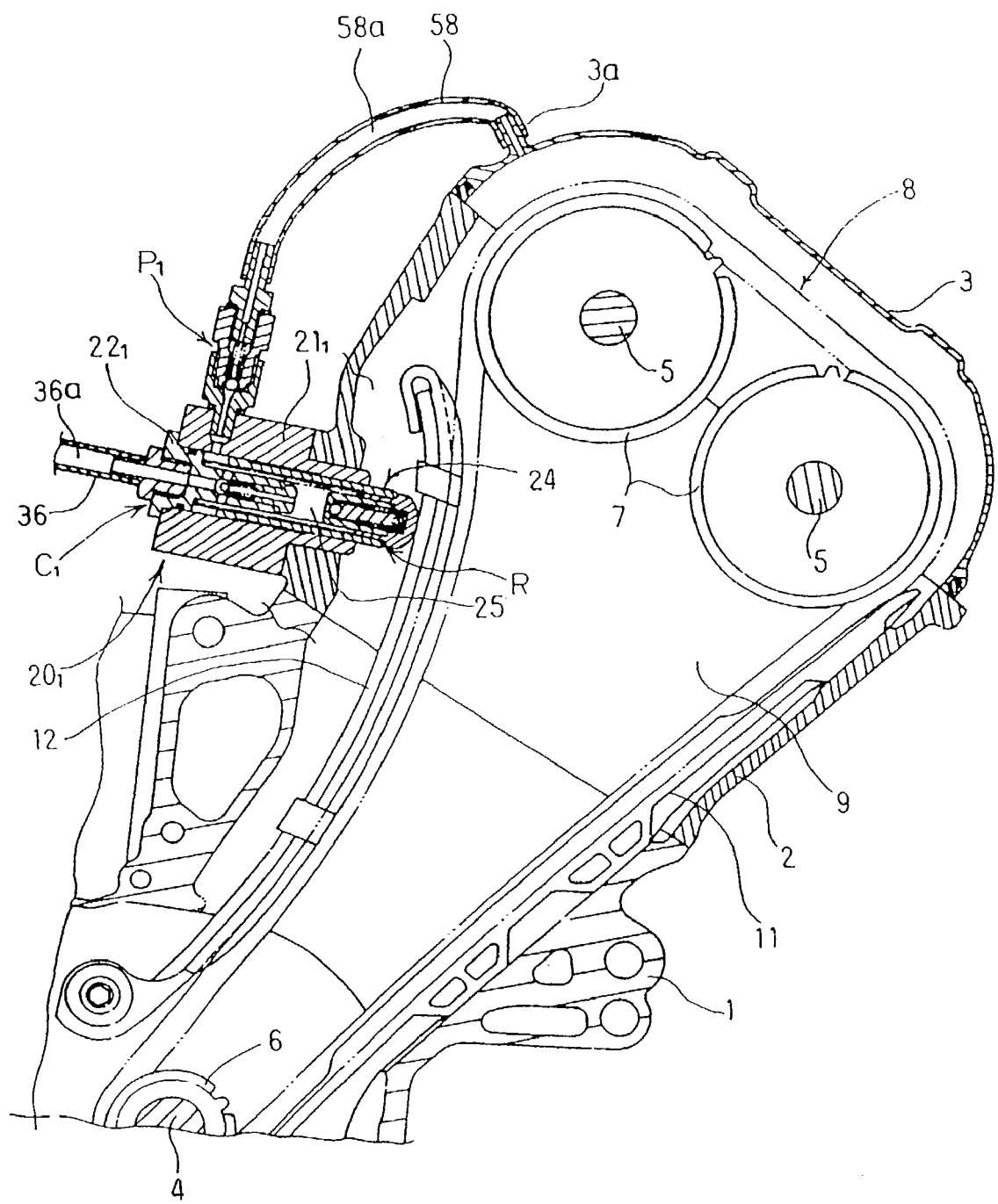
FIG. 7 shows a second embodiment of the present invention which is a sectional view corresponding to FIG. 1 of the first embodiment.
Figure 8:
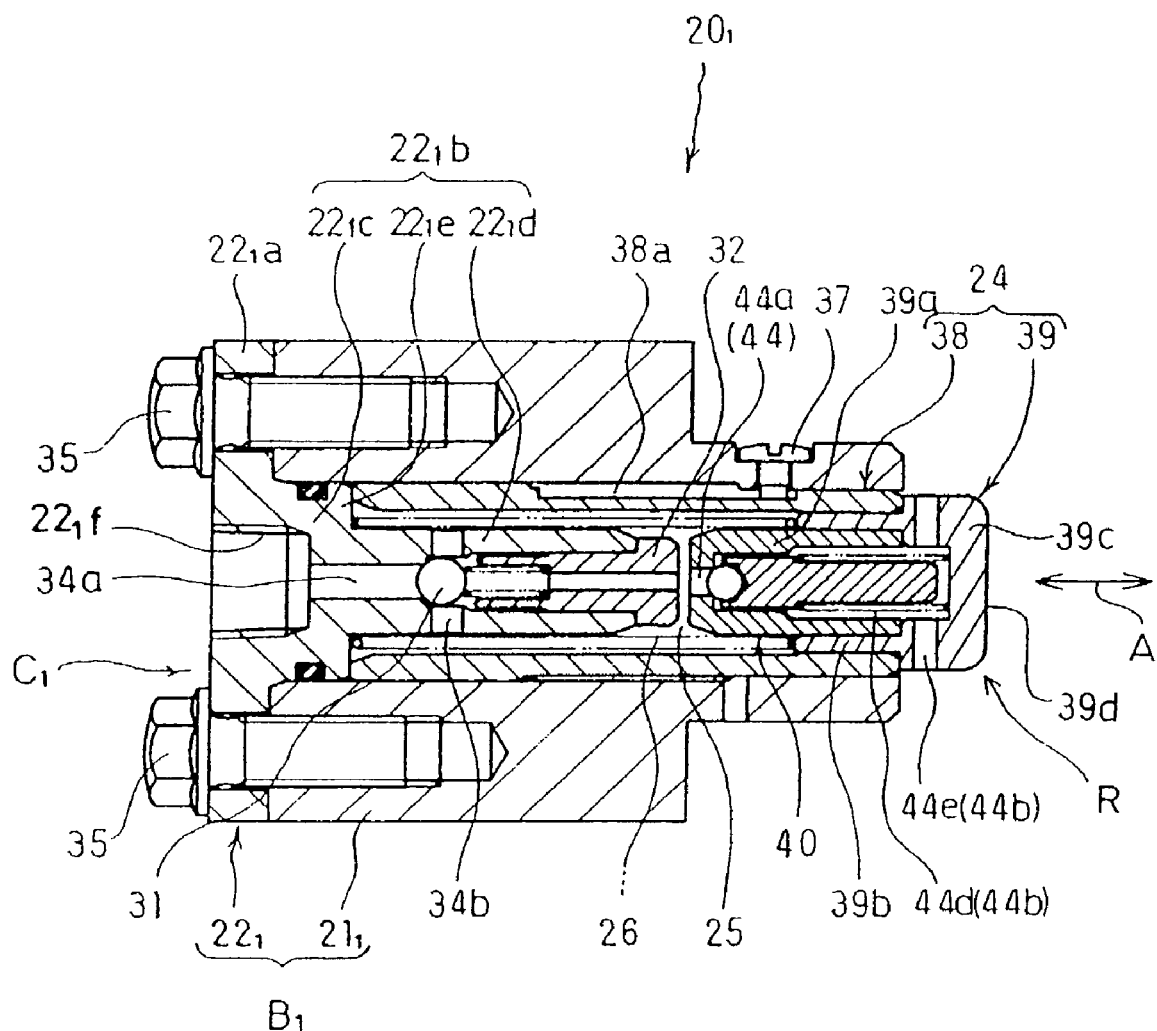
FIG. 8 is a sectional view of the hydraulic tensioner lifter of FIG. 7 corresponding to FIG. 3 of the first embodiment.
Figure 9:
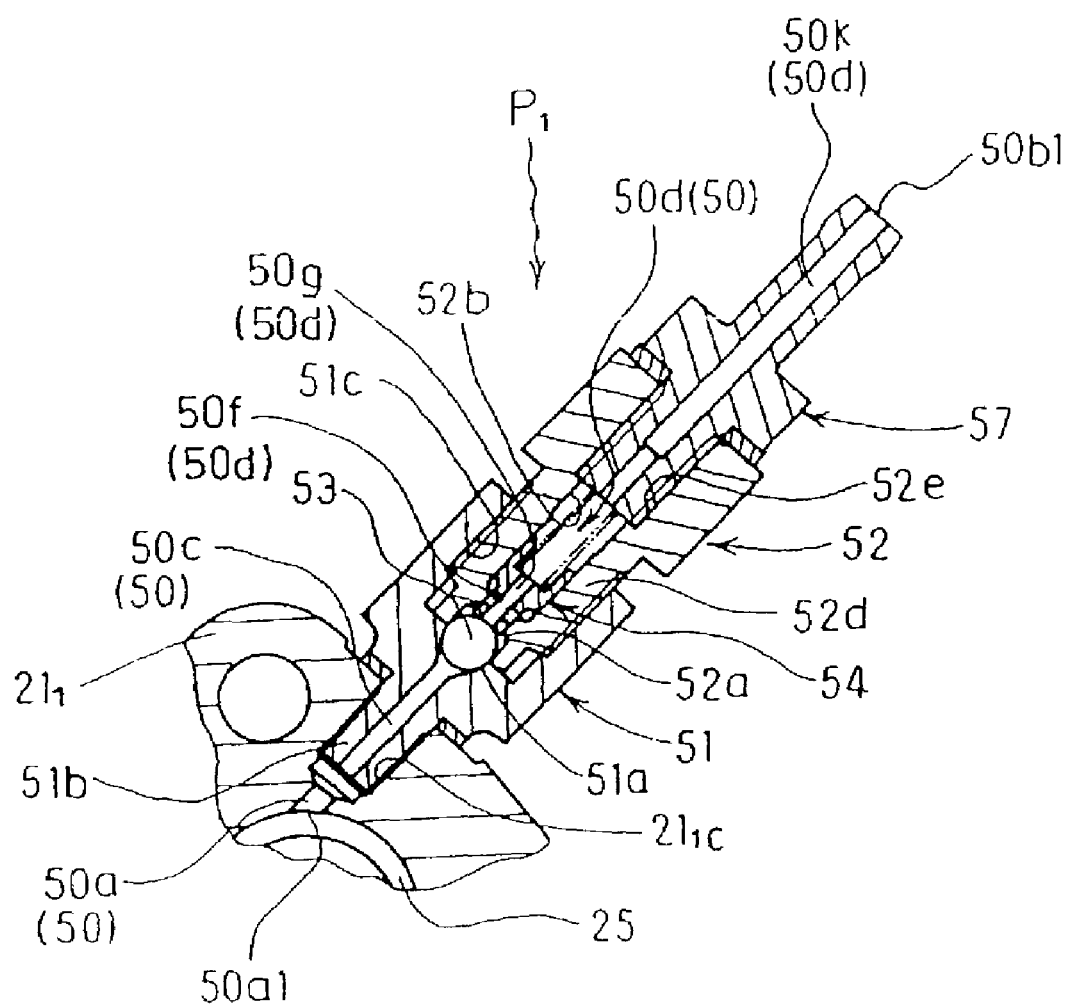
FIG. 9 is a sectional view of a purge valve of the hydraulic tensioner lifter of FIG. 7 taken along a plane perpendicular to an axial direction of a plunger.

Referring to FIGS. 6, 7 and 9, a purge valve P1 is not built in the first body 21$_1$ but is disposed outside the tensioner body B1 and is screwed into the first body 21$_1$ such that it is removably mounted on the first body 21$_1$. In particular, the purge valve P1 includes a first valve body 51 having a mounting portion 51$b$ for being screwed into a threaded hole 21$_1$$c$ of the first body 21$_1$ to mount the purge valve P1 on the first body 21$_1$, a second valve body 52 having an end portion 52$d$ for being screwed into a threaded hole 51$c$ of the first valve body 51 and contacting with the first body 211, a spherical valving element 53 accommodated between the contacting portions of the first valve body 51 and the second valve body 52 and capable of being seated on a first valve seat 51$a$ of the first valve body 51 and a second valve seat 52$a$ of the second valve body 52. A valve guide 54 is fitted for sliding movement in an accommodation hole 52$b$ formed in the second valve body 52 and contacting with the valving element 53. A pipe fitting 57 is screwed in a threaded hole 52$e$ of the second valve body 52 and serves as a spring receiver. A valve spring 56 in the form of a compression coil spring is disposed between the valve guide 54 and the pipe fitting 57 for biasing the valving element 53 in a valve closing direction through the valve guide 54 so that the valving element 53 may be seated on the first valve seat 51$a$ (refer to (A) of FIG. 6). A valve internal discharge path is provided that includes an entrance path 50$c$ formed in the first valve body 51 connected to an inflow path 50$a$ of the first body 21$_1$ and an exit path 50$d$ formed in the second body 22$_1$, valve guide 54 and pipe fitting 57 connected to a discharge path 58$a$ hereinafter described.

Here, also the valving element 53, the valve guide 54 and valve spring 56, and a valve seat formation portion 52$c$ are provided on the second valve body 52 and including a second valve seat 52$a$ are similar to those in the first embodiment. Accordingly, the purge valve P1 is a valve which has a check valve function of permitting discharge of air in an oil chamber 25 into a power transmission chamber 9 but blocking admission of air into the oil chamber 25 from the power transmission chamber 9.

As shown in FIGS. 6 and 9, a gap 50$e$ between a fitting portion 54$b$ of the valve guide 54 and the valve seat formation portion 52$c$, diametrical oil paths 50$f$ formed in the fitting portion 54$b$ and a hollow portion 50$g$ of the valve guide 54 and the accommodation hole 52$b$ are in communication with a discharge path 58$a$ (refer to FIG. 7) through a flow path 50$k$ of the pipe fitting 57. Therefore, the exit path 50$d$ is composed of the gap 50$e$, oil paths 50$f$, hollow portion 50$g$, accommodation hole 52$b$ and flow path 50$k$. Further, a discharge path 50 formed in the tensioner lifter 201 is formed from the inflow path 50$a$ and the valve internal discharge path which is formed from the entrance path 50$c$ and the exit path 50$d$.

The inflow path 50$a$ formed in the first body 21$_1$ has an entrance 50$a$1 which is open to an uppermost portion of the oil chamber 25, and an exit 50$b$1 of the flow path 50$k$ formed in the pipe fitting 57 is in communication with the power transmission chamber 9 through the discharge path 58$a$ formed from a hose 58 (refer to FIG. 7) which is a conduit connected at one end portion thereof to the pipe fitting 57 and connected at the other end thereof to a pipe fitting portion 3$a$ of a head cover 3.

According to the present second embodiment, the operation and effects similar to those of the first embodiment except operation and effects relating to the feature that the purge valve P1 is built in the tensioner body B 1 are exhibited, and in addition, the following operation and effects are exhibited.

Since the purge valve P1 is disposed outside the first body $21_1$ and removably mounted on the first body $21_1$, the structure of the mounting portion 51b of the purge valve P1 can be made common such that the purge valve P1 can be formed from a part for universal use. Consequently, the purge valve P1 of the same specifications can be applied to tensioner lifters of different models including a tensioner lifter which does not have a room for accommodation of the purge valve P1. Thus, the cost of the tensioner lifter 201 which includes the purge valve PI can be reduced. Further, since the degree of freedom of the mounting direction of the purge valve P1 increases, prevention of interference with another part disposed around the tensioner lifter 201 can be readily achieved and the degree of freedom of the layout of the tensioner lifter 201 increases.

Since the exit 50bi of the discharge path 50 which is opened and closed by the purge valve P1 is in communication with the power transmission chamber 9 through the discharge path 58a without allowing exhaustion of air into the external air, air exhausted from the oil chamber 25 and containing oil components is introduced into the power transmission chamber 9 through the hose 58 irrespective of the position at which the tensioner lifter 201 is secured. Consequently, the degree of freedom of the layout of the tensioner lifter 201 increases.

In the following, embodiments are described with respect to configuration of part of the embodiments described above in regard to the modified configuration.

While, in the first embodiment, the relief valve R is assembled to the plunger 24, the relief valve R may be assembled otherwise to the first body 21 such that the entrance path 44a of the relief valve R is open directly to the oil chamber 25 and the exit path 44b of the relief valve R is open directly to the power transmission chamber 9 of the tensioner lifter 20.

While, in the first and second embodiments, the endless power transmission band is a chain, it may otherwise be a belt. Further, the power transmission mechanism may drive the oil pump or some other auxiliary machine in place of driving the camshafts 5. Further, the tensioner which includes the tensioner lifter 20 or 201 may be a tensioner for an endless power transmission band of a power transmission mechanism used for an apparatus other than an internal combustion engine. Furthermore, the member to which the tensioner lifter 20 or 201 is assembled may otherwise be a component of the internal combustion engine other than the cylinder head 2 or a component of the apparatus described above.

While, in the second embodiment, the discharge path 50 is in communication with the power transmission chamber 9 through the hose 58, it is otherwise possible to connect the hose 58 to an air cleaner provided for an intake system of the internal combustion engine such that the discharge path 50 is in communication with the clean side of the air cleaner. Also by this, oil components contained in air exhausted from the oil chamber 25 are exhausted into the air cleaner which is an internal space of the internal combustion engine. Consequently, consumption of lubricating oil can be reduced and besides a contribution to the prevention of environmental pollution can be anticipated which is similarly as in the first embodiment.

Subsequently, another embodiment of the present invention is described with reference to FIG. 10. This embodiment is different from the first embodiment principally with respect to the member to which the relief valve is provided but has basically the same configuration except for this. Therefore, a description of the common elements is omitted or given simply, and principally the difference is described. It is to be noted that like elements or corresponding elements to those of the first embodiment are denoted by like reference characters.

Figure 10:
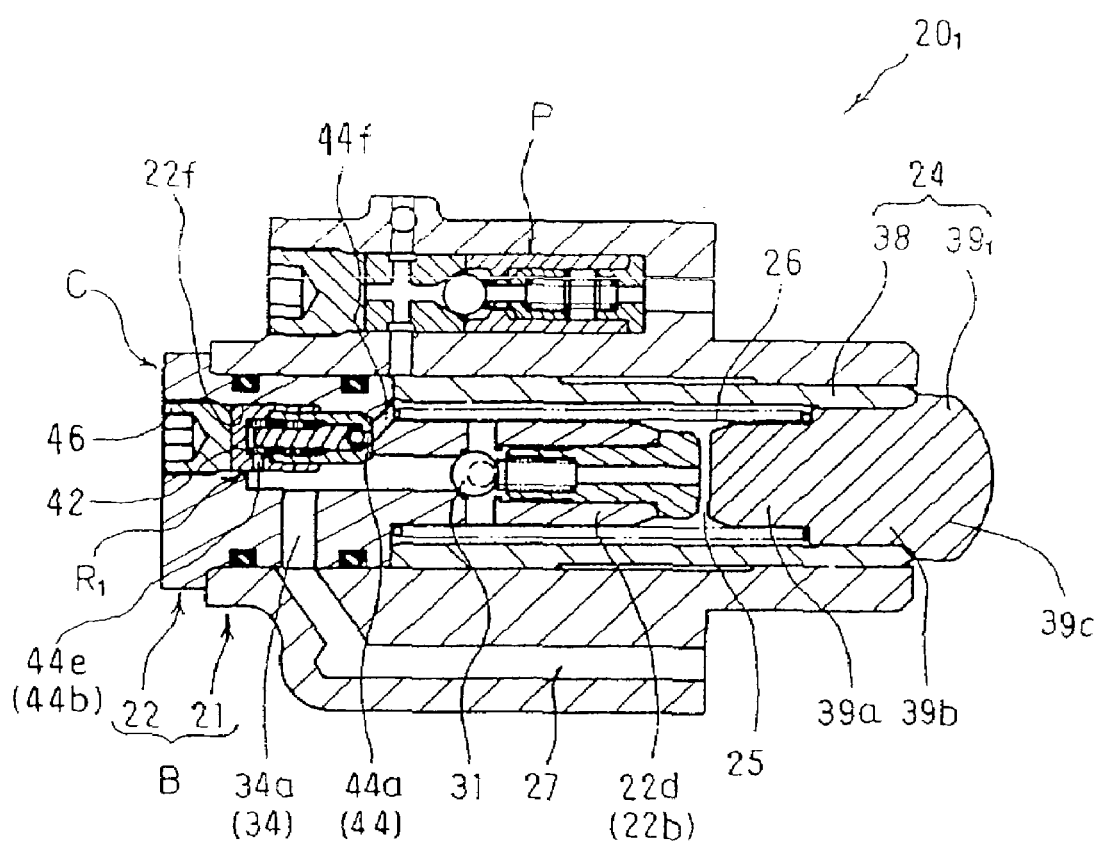
FIG. 10 is another embodiment of the present invention illustrating a sectional view corresponding to FIG. 2 of the first embodiment.

As illustrated in FIG. 10, a relief valve $R_1$ of a tensioner lifter $20_1$ is provided in a built-in form in the second body 22 (or the valve body 30 of the check valve C). The relief valve $R_1$ is accommodated in an accommodation hole 22f formed in the second body 22 and secured to the second body 22 by a plug 46 screwed in an oil-tight manner in an open end portion of the accommodation hole 22f. The structure of the relief valve $R_1$ is similar to that in the first embodiment except that the spring receiver 42 contacts with the plug 46 and is accommodated in the accommodation hole 22f and that the flow path 44e formed in the spring receiver 42 and forming the exit path 44b of the discharge path 44 is open to the outer face of the spring receiver 42 such that it is open directly to the entrance path 34a of the feed oil path 34. Further, the relief valve $R_1$ is assembled as an integrated single unit part to the second body 22.

The oil chamber 25 and the entrance path 44a of the relief valve $R_1$ are in communication with each other by an oil path 44f which is open to the oil chamber 25 at the stepped portion 22e. Therefore, in the present embodiment, the discharge path 44 is composed of the flow path 44f, entrance path 44a and discharge path 44b. Further, an end member 39, for closing up the open end of the base member 38 is a solid member including a spring guide portion 39a, a fitting portion 39b and a contacting portion 39c similar to those in the first embodiment.

According to the embodiment illustrated in FIG. 10, from the feature that the volume of the oil chamber 25 is decreased by the end member $39_1$ and the check valve C to reduce the filling time of oil pressure into the oil chamber 25 and the feature that the assembly of the relief valve $R_1$ and the check valve C is facilitated, operation and effects similar to those of the first embodiment are similar, and also the following operation and effects are similar. In particular, since the tensioner lifter $20_1$ includes the relief valve $R_1$ having the exit path 44b which is open directly to the entrance path 44a which is an oil path on the upstream side with respect to the valving element 31 of the check valve C, when it is tried to take a countermeasure for preventing oil pressure discharged from the relief valve $R_1$ from being discharged to the outside of the tensioner lifter $20_1$, there is no necessity to form an oil path for exclusive use for discharging oil pressure from the relief valve $R_1$. Consequently, the tensioner lifter $20_1$ becomes compact. Further, since the relief valve $R_1$ is assembled as an integrated single unit part to the tensioner body B, assembly of the relief valve $R_1$ to the tensioner body B is facilitated. Consequently, the assembly property of the tensioner lifter $20_1$ is improved.

Further, since the relief valve $R_1$ is built in the valve body 30 of the check valve C in advance, when the check valve C is assembled to the first body 21, also the relief valve $R_1$ is assembled to the first body 21 simultaneously. Also in this regard, a contribution to the improvement of the assembly property of the tensioner lifter 20, can be anticipated.

While, in the first embodiment, the relief valve R is assembled to the plunger 24, the relief valve R may be assembled otherwise to the first body 21 such that the entrance path 44a of the relief valve R is open directly to the oil chamber 25 and the exit path 44b of the relief valve R is open directly to the power transmission chamber 9 of the tensioner lifter 20.

While, in the embodiments of the present invention, the second body 22 serves also as the valve body 30 of the check valve C, it is otherwise possible to form them as separate members and assemble the check valve C now in the form of a unit part to the second body 22.

While, in the embodiment illustrated in FIG. 10, the exit path 44b of the relief valve $R_1$ is open directly to the entrance path 34a of the check valve C, the exit path 44b may otherwise be open directly to the feed oil path 27. Further, while the entrance path 44a of the relief valve R is in communication with the oil chamber 25 through the oil path 44f, the entrance path 44a may otherwise be open directly to the oil chamber 25.

While, in the embodiments of the present invention, the endless power transmission band is a chain, it may otherwise be a belt. Further, the power transmission mechanism may drive the oil pump or some other auxiliary machine in place of driving the camshafts 5. Further, the tensioner which includes the tensioner lifter 20 or $20_1$ may be a tensioner for an endless power transmission band of a power transmission mechanism used for an apparatus other than an internal combustion engine. Furthermore, the member to which the tensioner lifter 20 or $20_1$ is assembled may otherwise be a component of the internal combustion engine other than the cylinder head 2 or a component of the apparatus described above.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A hydraulic tensioner lifter comprising:
   a tensioner body having an accommodation hole formed therein;
   a plunger fitted for sliding movement in said accommodation hole and cooperating with said tensioner body to define an oil chamber therebetween;
   a tensioner spring for biasing said plunger in an advancing direction;
   a control valve for allowing an inflow of oil pressure into said oil chamber but blocking an outflow of the oil pressure from said oil chamber; and
   an air-bleeder mechanism for exhausting air in said oil chamber to the outside of said oil chamber, wherein tension is applied to an endless power transmission band of a power transmission mechanism by said plunger advanced from said accommodation hole;
   said air-bleeder mechanism includes a purge valve having an entrance positioned at an uppermost portion of said oil chamber and having a valving element for opening and closing an exhaust path for introducing air in said oil chamber to the outside of said oil chamber, and said purge valve has a check valve function of permitting an exhaustion of the air in said oil chamber to the outside of said oil chamber but blocking admission of the air into said oil chamber from the outside of said oil chamber and blocking a discharge of the oil pressure in said oil chamber to the outside of said oil chamber,
   said purge valve including:
   an accommodation hole;
   a first valve seat formed adjacent to an entrance path in the accommodation hole;
   a second valve seat is formed on a discharge path side in the accommodation hole;
   a valving element disposed between the first and the second valve seat in the accommodation hole; and
   a spring biasing the valving element toward the first valve seat in a closing direction,
   wherein a set load of said spring is set to a value such that,
   when pneumatic pressure of the air in the oil chamber is pushed out into an inflow path and the entrance path by the oil pressure supplied into the oil chamber acts upon the valving element, the valving element is spaced away from the first oil seat to open the valve, and
   when hydraulic pressure of the oil pressure supplied into the oil chamber and acting upon the valving element is higher than the pneumatic pressure, the valving element is seated on the second valve seat to close the valve.

2. The hydraulic tensioner lifter according to claim 1, wherein said purge valve is disposed in said tensioner body.

3. The hydraulic tensioner lifter according to claim 2, wherein the oil pressure flowing into said oil chamber is lubricating oil of an internal combustion engine, and an exit of said exhaust path is in communication with an internal space of said internal combustion engine.

4. The hydraulic tensioner lifter according to claim 1, wherein said purge valve is disposed outside said tensioner body and removably mounted on said tensioner body.

5. The hydraulic tensioner lifter according to claim 4, wherein the oil pressure flowing into said oil chamber is lubricating oil of an internal combustion engine, and an exit of said exhaust path is in communication with an internal space of said internal combustion engine.

6. The hydraulic tensioner lifter according to claim 5, wherein said exit of said exhaust path is in communication with said internal space through a conduit connected to said purge valve.

7. The hydraulic tensioner lifter according to claim 1, wherein the oil pressure flowing into said oil chamber is lubricating oil of an internal combustion engine, and an exit of said exhaust path is in communication with an internal space of said internal combustion engine.

8. The hydraulic tensioner lifter according to claim 7, wherein said exit of said exhaust path is in communication with said internal space through a conduit connected to said purge valve.

9. The hydraulic tensioner lifter according to claim 1, wherein the oil pressure flowing into said oil chamber is lubricating oil of an internal combustion engine, and an exit of said exhaust path is in communication with an internal space of said internal combustion engine.

10. A hydraulic tensioner lifter comprising:
    a tensioner body having a first body with a first accommodation hole and a second accommodation hole formed therein, said first and said second accommodation holes being separate from and parallel to each other;
    a plunger fitted for sliding movement in first said accommodation hole and cooperating with said tensioner body to define an oil chamber therebetween;
    a tensioner spring disposed in the inside of said plunger within said oil chamber for biasing said plunger in an advancing direction;
    a control valve for allowing an inflow of oil pressure into said oil chamber and blocking an outflow of the oil pressure from said oil chamber, wherein tension is applied to an endless power transmission band of a power transmission mechanism by said plunger advanced from said first accommodation hole; and a purge valve of an air-bleeder mechanism accommodated in said second accommodation hole of the first body, and said plunger including a base member for fitting in said first accommodation hole and an end member integrally secured to said base member and forming an end portion of said plunger, said end member having a spring guide portion accommodated in the inside of said tensioner spring for guiding said tensioner spring, wherein a cylinder axis has an inclined direction with respect to a horizontal plane, the tensioner body being disposed in a position opposite to the inclined direction of the cylinder axis, the purge valve being disposed above the plunger, and the tensioner body having a tensioner side feed oil path.

11. The hydraulic tensioner lifter according to claim 10, wherein said tensioner lifter comprises a relief valve for discharging the oil pressure in said oil chamber to the outside of said tensioner lifter, and said relief valve has an entrance path which is open directly to said oil chamber and an exit path which is open directly to the outside of said tensioner lifter and is assembled as an integrated unit part to said tensioner body or said plunger.

12. The hydraulic tensioner lifter according to claim 11, wherein said end member is said relief valve assembled to said plunger.

13. The hydraulic tensioner lifter according to claim 12, wherein part of said control valve is accommodated inside of said plunger within an overall range of movement of said plunger.

14. The hydraulic tensioner lifter according to claim 12, wherein said tensioner body includes a second body, and said control valve is formed from said second body and is assembled as an integrated single unit part to said first body.

15. The hydraulic tensioner lifter according to claim 11, wherein part of said control valve is accommodated inside of said plunger within an overall range of movement of said plunger.

16. The hydraulic tensioner lifter according to claim 10, wherein part of said control valve is accommodated inside of said plunger within an overall range of movement of said plunger.

17. The hydraulic tensioner lifter according to claim 16, wherein said tensioner body includes a second body, and said control valve is formed from said second body and is assembled as an integrated single unit part to said first body.

18. The hydraulic tensioner lifter according to claim 10, wherein said tensioner body includes a second body, and said control valve is formed from said second body and is assembled as an integrated single unit part to said first body.

19. The hydraulic tensioner lifter according to claim 11, wherein said tensioner body includes a second body, and said control valve is formed from said second body and is assembled as an integrated single unit part to said first body.

20. The hydraulic tensioner lifter according to claim 10, wherein said tensioner lifter comprises a relief valve having an exit path for directly releasing oil pressure in said oil chamber to an oil path on the upstream side with respect to a valving element of said control valve, and said relief valve is assembled as an integrated single unit part to said tensioner body.

21. A hydraulic tensioner lifter comprising:

a tensioner body having an accommodation hole formed therein;

a plunger fitted for sliding movement in said accommodation hole and cooperating with said tensioner body to define an oil chamber therebetween;

a tensioner spring for biasing said plunger in an advancing direction;

a control valve for allowing an inflow of oil pressure into said oil chamber but blocking an outflow of the oil pressure from said oil chamber; and an air-bleeder mechanism for exhausting air in said oil chamber to the outside of said oil chamber, wherein tension is applied to an endless power transmission band of a power transmission mechanism by said plunger advanced from said accommodation hole;

said air-bleeder mechanism includes a purge valve having an entrance positioned at an uppermost portion of said oil chamber and having a valving element for opening and closing an exhaust path for introducing air in said oil chamber to the outside of said oil chamber, and said purge valve has a check valve function of permitting an exhaustion of the air in said oil chamber to the outside of said oil chamber but blocking admission of air into said oil chamber from the outside of said oil chamber and blocking a discharge of the oil pressure in said oil chamber to the outside of said oil chamber, wherein said purge valve is disposed outside said tensioner body and removably mounted on said tensioner body.

22. A hydraulic tensioner lifter comprising:

a tensioner body having an accommodation hole formed therein;

a plunger fitted for sliding movement in said accommodation hole and cooperating with said tensioner body to define an oil chamber therebetween;

a tensioner spring disposed in the inside of said plunger within said oil chamber for biasing said plunger in an advancing direction;

a control valve for allowing an inflow of oil pressure into said oil chamber and blocking an outflow of the oil pressure from said oil chamber, wherein tension is applied to an endless power transmission band of a power transmission mechanism by said plunger advanced from said accommodation hole; and a purge valve disposed outside said tensioner body and removably mounted on said tensioner body said plunger including a base member for fitting in said accommodation hole and an end member integrally secured to said base member and forming an end portion of said plunger, said end member having a spring guide portion accommodated in the inside of said tensioner spring for guiding said tensioner spring.

* * * * *